Figure 1:
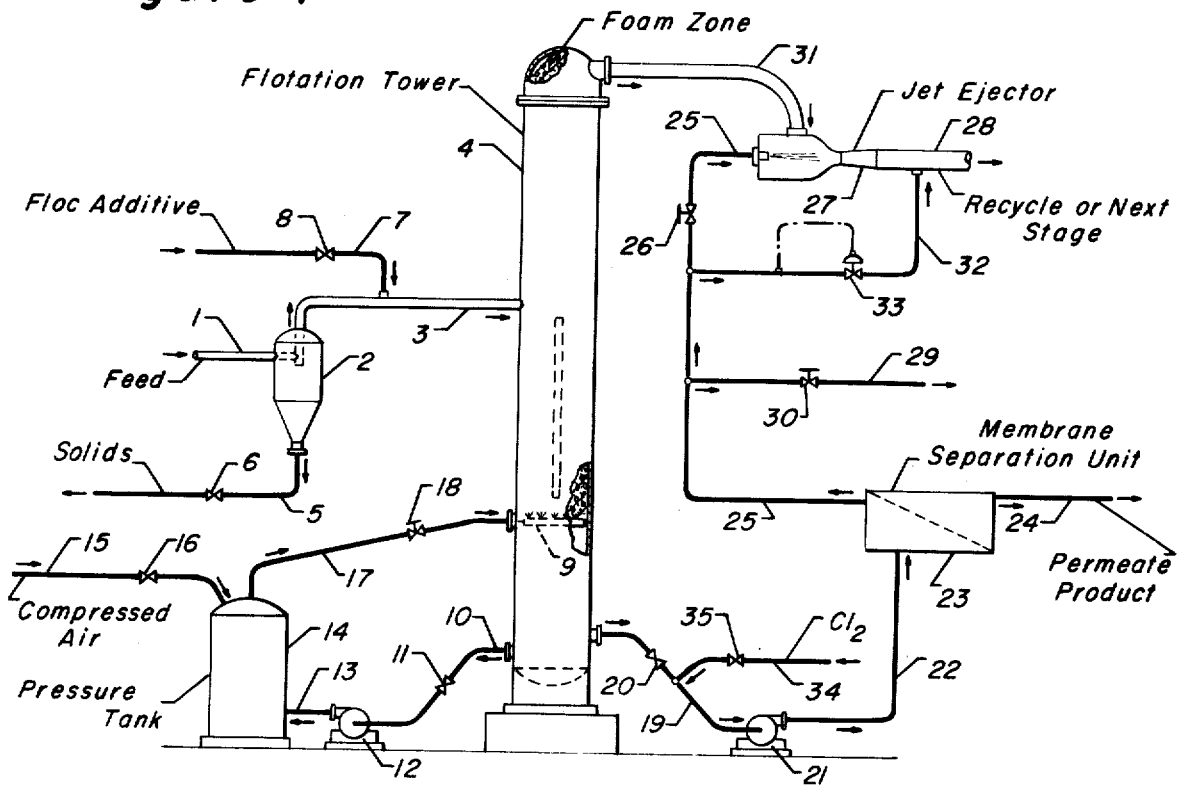

United States Patent [19]
Jennings

[11] 3,917,526
[45] Nov. 4, 1975

[54] COMBINED FOAM FLOTATION AND MEMBRANE SEPARATION PROCESSING

[75] Inventor: James L. Jennings, Poway, Calif.
[73] Assignee: Universal Oil Products Company, Des Plaines, Ill.
[22] Filed: Apr. 4, 1974
[21] Appl. No.: 458,165

[52] U.S. Cl. .................. 210/23; 210/321; 210/433
[51] Int. Cl.² .................. B01D 31/00; B01D 13/00
[58] Field of Search ............... 210/23, 44, 321, 433

[56] References Cited
UNITED STATES PATENTS

| | | | |
|---|---|---|---|
| 2,793,185 | 5/1957 | Albrektsson et al. | 210/44 |
| 3,472,765 | 10/1969 | Budd et al. | 210/23 X |
| 3,528,550 | 9/1970 | Cappelen, Jr. | 210/321 X |
| 3,552,574 | 1/1971 | Lowe et al. | 210/23 X |
| 3,617,550 | 11/1971 | Elata et al. | 210/23 |
| 3,799,873 | 3/1974 | Brown | 210/23 X |

OTHER PUBLICATIONS
Gouveia et al., "Potable Water From Hospital Wastes By Reverse Osmosis," from Chemical Engineering Progress Symposium Series Vol. 64, No. 90, 1968, copy in Op. 176, pp. 280–284.

*Primary Examiner*—Frank A. Spear, Jr.
*Attorney, Agent, or Firm*—James R. Hoatson, Jr.; Philip T. Liggett; William H. Page, III

[57] ABSTRACT

A foam flotation step, which can be of particular advantage to remove suspended solids, fats, oily wastes, etc., from a liquid stream, is combined with one or more membrane separation stages to effect an improved multi-stage processing operation that reduces the rapid blockage of membrane surfaces. A preferred method of operation utilizes the high pressure energy of the concentrate stream from a membrane separation stage to effect the eduction removal of foam from the top of the flotation stage.

7 Claims, 2 Drawing Figures

COMBINED FOAM FLOTATION AND MEMBRANE SEPARATION PROCESSING

The present invention relates to an improved multiple stage separation system which utilizes at least one membrane separation stage and an integrated foam flotation preliminary feed stream treatment to remove solids, oily materials, fat globules, etc., which can rapidly block membrane surfaces.

In a more specific aspect, the invention is directed to a combination of foam flotation and membrane separation stages to provide an improved method of operation to effect the separation and purification of a feed stream, with the energy of the concentrate stream from an elevated pressure membrane separation stage being used to educt foam from the top of the foam flotation stage.

Membrane separation operations are typified by present day ultrafiltration and reverse osmosis processing units are, of course, not new to science or to industry; however, these operations are becoming more widely used and are now more economically important for industrial separations. While membrane processes do not require the energy expenditures of vaporization and crystallization operations, it is still necessary and desirable to minimize operating costs of any process and, in connection with membrane separation processing, it is important to have high flux rates in order to permit relatively small surface areas for the membranes and resulting lower equipment costs. Also, the longer a membrane separation unit can keep processing, without requiring back-flushing and cleaning, then the more efficient and inexpensive is the resulting operation.

Actually, there are many types of separation procedures which can be carried out in membrane separation systems, as for example: the purification of polluted and brackish waters; the treatment of sewage or industrial biological wastes; the separation of cheese whey to recover protein and lactose; the concentration of fruit juices; the separation of sulfite liquor in the wood pulp paper making industry; etc., and, in many of these types of operations there may well be used an aeration and foam flotation pretreating step to help remove solids and non-soluble materials from the main feed stream.

In addition to the general overall advantages which can result from effecting a combination of a flotation step with one or more membrane separation steps in treating a feed solution carrying suspended and/or undissolved components, it is an object of the present invention to utilize the pressure of a concentrate stream leaving an ultrafiltration or reverse osmosis unit to effect an eduction of foam from the top of the flotation tower. Such eduction of the foam can eliminate the need of the conventional mechanical means which is used to effect a foam removing operation and as a result can provide still further energy savings in the overall system.

Ultrafiltration units typically operate in the 30 to 100 psi pressure range, while reverse osmosis units may well operate at pressures of several hundred pounds per square inch and up to 1000 psi. As a result, the concentrate stream leaving any membrane separation stage has a lot of energy which may well be used through jet pumping eductor means which has the low pressure zone thereof made directly connective with the upper foam containing zone of a flotation unit so as to assist in removing the foam and entrained materials being generated in such a unit.

In one embodiment, the present invention provides in connection with a membrane separation processing operation where the feed stream has entrained, non-soluble material which is at least partially removable by a foam flotation procedure, the improved multi-stage separation operation which comprises, passing the feed stream to a flotation separation stage and therein effecting the aerating and foam lifting of at least a portion of such entrained material to separate it from passage to a subsequent membrane separation stage, withdrawing liquid feed from below the upper foam containing zone of the flotation stage and passing such feed to a membrane separation stage for contact with a membrane at an elevated pressure to effect a desired product separation, discharging and collecting the desired permeate from said membrane separation stage, additionally discharging the elevated pressure concentrate stream from the latter stage and passing it through a jet pumping ejector means which has the low pressure throat zone thereof in open communication with the upper foam containing zone of said flotation stage, whereby foam and aerated entrained material therefrom will be withdrawn from such state and discharged with the concentrate passing through the ejector means.

In another embodiment, the present invention provides a combined foam flotation and membrane separation system adapted to process a feed stream having undissolved and suspended components which comprises in combination, a liquid holding flotation chamber, inlet means to charge a liquid feed stream to said chamber, gas inlet means to introduce an aerating gas stream into the liquid being passed into said flotation chamber to effect foam formation and the elevation of suspended material therein, a foam outlet means from the upper portion of said chamber and a liquid withdrawal means from the lower portion of said chamber, liquid transfer means connecting said liquid withdrawal means to a membrane separation section, a low pressure permeate withdrawal means and an elevated pressure concentrate stream outlet means from said membrane separation section, conduit means connecting the outlet means for the concentrate stream to the eductor discharge means, and means connecting the suction zone of the latter to the upper foam outlet means for said flotation chamber, whereby the elevated pressure energy of the concentrate stream passing through the eductor means provides suction and an assisted withdrawal of the foam and suspended material from said flotation chamber.

It is not intended to limit the present invention to any one type of processing operation nor to the use of any one type of equipment or separation apparatus in any one section of a system. For example, various types of aerating towers suitable to effect from formation and effect the flotation of suspended matter may be used to advantage as the preliminary stage of the present system. Actually, additional separation steps may be used ahead of or in combination with a foam forming flotation tower such as the use of a settling basin, centrifugal separation or centrifuging, a flocculating step, electrolysis, etc. However, it is a particular feature of the present invention to make use of the pressure and energy remaining in the main flow stream of a membrane separation unit be available for assisting in the withdrawal of foam from the flotation tower. The membrane separation step itself may comprise and ultrafiltration unit which impedes the passage of molecules with a molecular weight of about 100 or higher; a micro-filtration unit which can allow passage of solvent molecules but impede the passage of large colloids and small particles; or may comprise a reverse osmosis unit which merely allows the passage of water or other hydrogen bonding solvents but will impede the passage of salts and small molecules. The pressure used for the feed stream and resulting in the concentrate stream from a membrane separation unit will, of course, depend upon the type of separation being undertaken, with reverse osmosis units utilizing quite high superatmospheric pressures as compared to the ultrafiltration types of units, as hereinbefore noted.

The combined processing system may, for example, be used in connection with the treatment of whey where suspended cheese solids and globules of fat may well be aerated and removed from a principal feed stream in a foam forming tower. The removal of the suspended solids will permit higher flux rates through the membrane separation unit and will also permit longer periods of operation between back-flushing and the cleaning of the membrane surface(s). Also, a foaming tower can be of advantage in reducing the concentration of protein in the feed to an ultrafiltration unit in order to reduce the concentration polarization. The protein content being carried over into an ejector unit with foam from the flotation tower can be added to the protein remaining in the concentrate stream from the ultrafiltration unit and allow for higher protein concentration with a smaller sized ultrafilration unit.

A foam forming flotation tower may also be used to advantage in connection with treatment of sulfite liquors in the wood pulp paper industry where it can be desirable to treat a feed stream ahead of the reverse osmosis unit in order to prevent fibers and suspended pulp-like materials from being carried into and against the membrane surfaces of the membrane separation unit. In other words, suspended matter would be removed from the sulfite containing stream ahead of the membrane separation unit and then at least a part of the resulting concentrate stream then used to help educt foam from the flotation tower by having such part or all of the concentrate passed through a jet pumping means and, in turn, having the suction side of the latter connective with the foam zone of the flotation tower. In other multiple stage operations, fibers or other suspended matter may be removed from a liquid stream by foam flotation or oil and grease in contaminated water streams may be floated to the surface through aeration and foam formation to be subsequently removed by ejector means whereby the remaining water containing liquid stream may be advantageously and efficiently processed through a membrane separation stage to effect a desired separation or purification of the feed stream.

Typically, air is compressed and used for introduction into the intermediate or lower portion of the foam forming tower in order to effect the aeration of liquid therein and the desired suspension and lifting of entrained materials for withdrawal along with the resulting foam. However, pressurized carbon dioxide, nitrogen, or other non-harmful gaseous medium may be used to advantage in a particular processing operation, rather than use air, to effect the desired foam formation in the flotation stage.

Reference to the accompanying drawing and the following description thereof will serve to further illustrate the present improved multiple stage processing system and serve to point out additional advantageous features which may be obtained therewith.

FIG. 1 of the drawing is a schematic view of a combined system providing a foam forming flotation tower integrated with a membrane separation unit and the jet stream eduction of foam from the flotation tower of the system.

Figure 2:
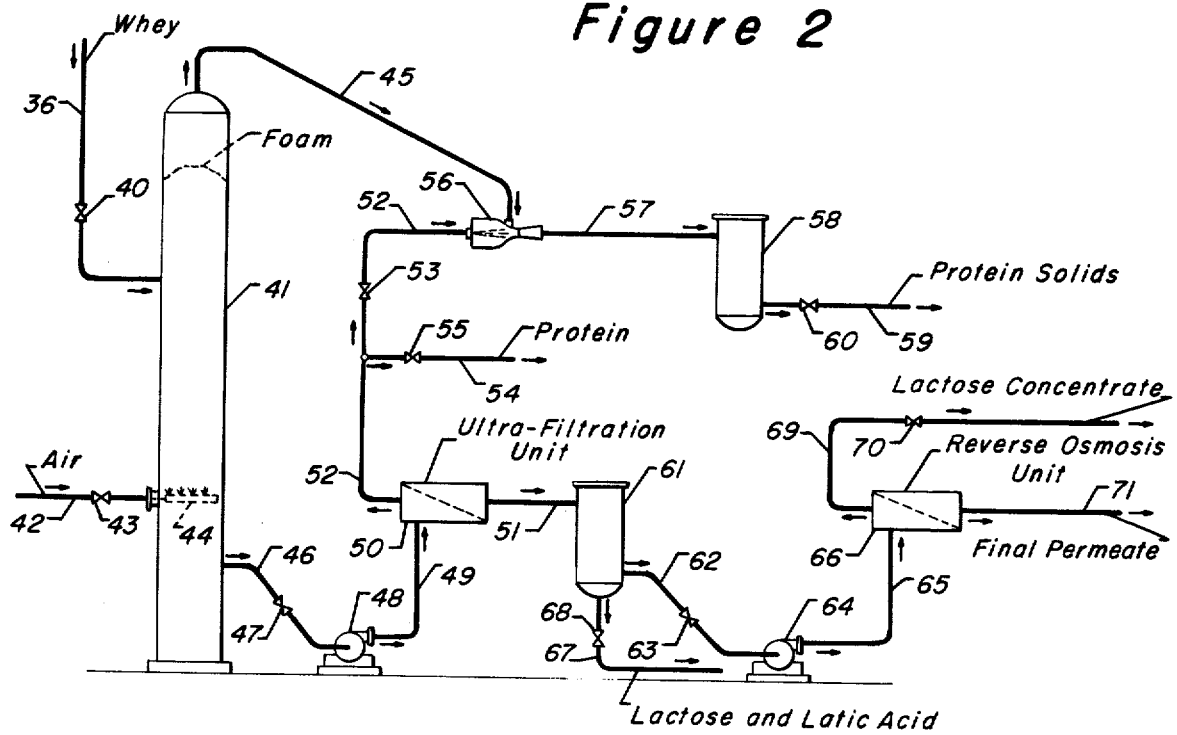

FIG. 2 of the drawing is another schematic diagram showing a multiple stage processing operation where a foam forming flotation tower is used ahead of an ultrafiltration unit and a reverse osmosis unit for the processing of cheese whey.

Referring now particularly to FIG. 1 of the drawing, there is indicated the passage of a water containing feed stream which initially carries suspended, undissolved materials that could lead to having the membrane surfaces rapidly fouled to the solids of grease-like materials blocking the membrane pores. Thus, the feed stream is indicated as passing through conduit 1 into an initial centrifugal separator means 2 and then passing by way of line 3 into a flotation tower 4. Heavy solids may be continuously removed from the lower portion of the centrifugal separator 2 by way of line 5 having valve means 6 and, where desired, a flocculating agent or other additive material may be added to the feed stream by way of line 7 having control valve 8. The flotation tower 4, as shown by the present drawing, shall have suitable air or other aerating gas distributing means at 9 within a lower portion thereof such that gas bubbles can rise through the height of the tower to effect foam formation and the entrainment and lifting of suspended components within the feed stream. For example, oils and fatty materials which are not dissolved within the feed stream, along with suspended solid material, can be lifted and carried to the top of the flotation tower where a foam-like bed is formed which holds and entraps the elevated components. In the present embodiment, a portion of the liquid feed is withdrawn from the lower end of the tower 4 at line 10 having valve 11 and then carried through pump means 12 and line 13 into pressure tank 14. Compressed air is indicated as being introduced into the latter by way of line 15 and valve 16 such that pressurized air and liquid can be discharged by way of line 17 and control valve means 18 into the distributor means 9 for effecting the desired aeration of the liquid in tower 4.

The non-aerated feed stream from the lower portion of tower 4 is also withdrawn from the lower portion of the tower 4 by way of line 19, having control valve 20, and passed to compressor means 21 which introduces the resulting pressurized stream through line 22 into the membrane separation unit 23. The latter is indicated diagrammatically and may comprise any one of the conventional types of membrane separation units, i.e. plate and frame-type, tubular, spiral wound, hollow-fiber, etc. The particular type of membrane in any particular type of unit can also depend upon the type of feed being processed in the system.

In accordance with the present invention, the permeate stream is indicated as being withdrawn by way of line 24 while the pressurized concentrate stream is withdrawn by way of line 25 and valve 26 to be passed at least in part through jet pumping means at 27 for discharge by way of line 28. Where desired, a portion of the concentrate stream maay be withdrawn by way of line 29 having valve means 30. The jet pumping means at 27 has the throat, or lower pressure zone therein, connective by way of a conduit or passageway means 31 to the upper foam containing section of tower 4 whereby the foam removal is accomplished by the vacuum effect from jet pumping means 27. The foam and entrained material therein will, of course, be admixed with the concentrate stream which is being pumped and ejected outwardly through discharge line 28. For purposes of pressure control, there is indicated a by-pass line 32 with pressure regulating valve means 33 therein which is connective between concentrate line 25 and discharge line 28.

It is to be reiterated that the present schematic drawing is not complete as to drain lines, additional inlet lines for additive materials, recycle lines, etc. For example, chlorine or other cleaning medium may be introduced into the membrane separation unit during periods of back-flushing and cleaning by way of line 34 and valve 35 in the compressor line 19, or other suitable location. Also means may be provided to recycle at least a portion of the condensate stream from line 29 or line 28 back through the flotation tower or through the membrane separation unit 23. It is to be further noted, as hereinbefore briefly set forth, that additional pretreating separation stages may be used for the feed stream ahead of separator means 2 or, alternatively, there may be additional stages of membrane separation downstream from unit 23 for either the permeate product stream or for the concentrate stream.

Referring now to FIG. 2 of the drawing, there is shown a multiple stage processing operation such as for the processing of a cheese whey with a feed stream being introduced by way of line 36 and valve 40 into a foam forming flotation tower 41 which is also receiving air or other gaseous medium by way of line 42, valve means 43 and distributor means 44. The resulting bubbles and foams are carried to the top of the tower 41 for transfer by way of line 45 while the non-aerated resulting whey stream with entrained fat and cheese components as well as some protein material eliminated, is withdrawn by way of line 46 and valve 47 for introduction into compressor means 48. The latter discharges by way of line 49 into an ultrafiltration unit indicated diagrammatically at 50 such that a water, lactose and lactic containing stream may be withdrawn as permeate by way of line 51 while a protein containing concentrate stream is discharged by way of line 52 having control valve 53. A portion of this protein containing stream may be withdrawn by way of line 54 and valve 55 while, in accordance with the present invention, at least a portion carries through a venturi-type jet pumping means 56 for discharge by way of line 57 into vessel 58. The throat or vacuum zone of the jet pumping means 56 is made directly connective with the transfer line 45 and the foam containing zone within the upper portion of flotation tower 41, whereby the foam is assisted in its removal from the tower by way of the jet pumping means 56. The foam and suspended particles from the whey feed stream is, of course, combined and intermixed with the protein containing stream being introduced into vessel 58. The collected material from this vessel may be withdrawn by way of line 59 and valve 60 for evaporation and drying and/or may be recycled at least in part through the present system.

In accordance with the preferred method for handling a cheese whey, the permeate material being drawn by way of line 51 is introduced into a receiving vessel 61 and at least a portion thereof is drawn by way of line 62 and valve means 63 for introduction into compressor 64 and charge line 65 to be cycled through a reverse osmosis unit at 66. Where desired, a portion of the lactose containing stream may be withdrawn from vessel 61 by way of line 67 and valve means 68. At the reverse osmosis unit 66 there is a lactose containing concentrate stream withdrawn by way of line 69 and valve 70 while a water containing permeate stream is discharged by way of line 71. The latter stream may be further processed or sent to waste as a relatively clear, non-polluting stream. The lactose containing stream from line 69 may be further processed by way of evaporation and drying or be subjected to still further processing.

In the operation provided diagrammatically by FIG. 2, air or other suitable aerating fluid will be used for effecting the desired foam formation flotation tower 41, with a sufficient quantity of air and pressure utilized to effect the desired lifting and suspension of entrained cheese and fat globules to insure the substantial elimination of such components from the feed stream passing to the ultrafiltration unit. As heretofore noted, the ultrafiltration and reverse osmosis type membrane separation unit may be any of the conventional types of membrane supporting tubes or of the plate and frame construction, etc.; however, any one of the various types of units will have an enhanced operation by the elimination of membrane fouling materials, such as solid particulates and greasy or fatty materials. Typically, the ultrafiltration unit for handling a cheese whey will operate in the 30-250 psi range while the lactose containing stream being introduced into the reverse osmosis operation 66 will have a substantially higher pressure of 300 psi or more. In any event, it will be obvious that the concentrate stream leaving the ultrafiltration unit 50 by way of line 52 will have a pressure energy available for introduction to the jet pumping means 56 for effecting the removal of foam from the top of tower 41 in a continuous enhanced manner. The eduction arrangement is, of course, of advantage in eliminating the need for a mechanical means normally utilized in effecting foam removal from the top of a flotation tower. As a result, the present multiple stage method of handling a feed stream such as cheese whey, where there is a substantial amount of solids and/or fatty materials, can be handled in an efficient energy saving manner. The diagram of FIG. 2 is, of course, schematic in that various drain lines, clean-out lines, additive inlets, heating and/or cooling means, and the like, have been eliminated from the drawing. Also where desirable to those skilled in a particular processing operation, it may be obvious to incorporate various recycle arrangements within the multiple stage system to effect further concentrations and processing efficiency.

I claim as my invention:

1. In a pressurized membrane separation processing operation were the feed stream has entrained, non-soluble material which is at least partially removable by a foam flotation procedure, the improved multi-stage separation operation which comprises, passing the feed stream to a flotation separation stage and therein effecting the aerating and foam lifting of at least a portion of such entrained material to separate it from passage to a subsequent membrane separation stage, withdrawing liquid feed from below the upper foam containing zone of the flotation stage and passing such feed to pressurizing means and then to a membrane separation stage for contact with a membrane at an elevated pressure above 30 psi to effect a desired product separation, discharging and collecting the desired permeate from said membrane separation stage, additionally discharging the elevated pressure concentrate stream from the latter stage and passing at least a portion thereof through a jet pumping ejector means which has the low pressure throat zone thereof in open communication with the upper foam containing zone of said flotation stage, whereby foam and aerated entrained material therefrom will be withdrawn from such stage and discharged with the concentrate passing through the ejector means.

2. The membrane separation processing operation of claim 1 further characterized in that at least a portion of the concentrate stream from the membrane separation stage is recycled within said system back to the membrane separation stage.

3. The membrane separation processing operation of claim 1 further characterized in that at least a portion of the permeate from the membrane separation stage is introduced into a reverse osmosis type membrane separation stage for further fractionation.

4. The membrane separation processing operation of claim 1 further characterized in that said membrane separation stage is of the ultrafiltration type operating at superatmospheric pressure in the range of from 30–100 psi and the permeate from said stage is subsequently pressurized to the order of at least about 300 psi and introduced into a reverse osmosis type membrane separation unit for further separation.

5. The method of claim 4 still further characterized in that the feed stream is a whey material containing suspended cheese and fat globules whereby such entrained materials may be at least primarily eliminated in said flotation separation stage, the concentrate stream from the ultrafiltration unit passing to the jet pumping ejector means is primarily a protein containing stream, and the permeate passing to said reverse osmosis stage is a lactose-lactic acid containing stream whereby to provide a concentrate stream of the latter materials.

6. A combined foam flotation and membrane separation system adapted to process a feed stream having undissolved and suspended components which comprises in combination, a liquid holding foam forming flotation chamber, inlet means to charge a liquid feed stream to said chamber, gas inlet means to introduce an aerating gas stream into the liquid being passed into said flotation chamber to effect foam formation and the elevation of suspended material therein, a foam outlet means from the upper portion of said chamber and a liquid withdrawal means from the lower portion of said chamber, liquid transfer means connecting said liquid withdrawal means to high pressure producing means and means to pass the resulting pressurized stream from the latter to a membrane separation section, a low pressure permeate withdrawal means and an elevated pressure concentrate stream outlet means from said membrane separation section, conduit means connecting the outlet means for the concentrate stream to a jet pumping eductor discharge means, and means connecting the suction zone of the latter to the upper foam outlet means for said flootation chamber, whereby the elevated pressure energy of the concentrate stream passing through said eductor means can provide suction and an assisted withdrawal of the foam and suspended material from said flotation chamber.

7. The combined separation system to claim 6 further characterized in that the low pressure permeate withdrawal means from said membrane separation section is connective with at least one additional membrane separation section whereby there is further separation of the feed to provide a further concentrate stream and a more purified permeate stream.

* * * * *